United States Patent
Glover et al.

(10) Patent No.: US 11,135,542 B2
(45) Date of Patent: Oct. 5, 2021

(54) PROCESSES AND APPARATUSES FOR REMOVING CONTAMINANTS FROM HYDROGEN STREAMS

(71) Applicant: UOP LLC, Des Plaines, IL (US)

(72) Inventors: Bryan K. Glover, Algonquin, IL (US); Mohamed S. M. Shakur, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 817 days.

(21) Appl. No.: 15/786,058

(22) Filed: Oct. 17, 2017

(65) Prior Publication Data
US 2018/0117523 A1   May 3, 2018

Related U.S. Application Data

(60) Provisional application No. 62/414,635, filed on Oct. 28, 2016.

(51) Int. Cl.
*B01D 53/04* (2006.01)
*B01D 53/26* (2006.01)
(Continued)

(52) U.S. Cl.
CPC ....... *B01D 53/0423* (2013.01); *B01D 53/261* (2013.01); *B01D 53/864* (2013.01); *C10G 25/05* (2013.01); *B01D 2253/102* (2013.01); *B01D 2253/104* (2013.01); *B01D 2253/106* (2013.01); *B01D 2253/116* (2013.01);
(Continued)

(58) Field of Classification Search
CPC ........ B01D 2253/102; B01D 2253/104; B01D 2253/106; B01D 2253/116; B01D 2256/16; B01D 2257/50; B01D 2257/80; B01D 2259/122; B01D 53/0423; B01D 53/261; B01D 53/864; C10G 25/05
See application file for complete search history.

(56) References Cited

U.S. PATENT DOCUMENTS 5,000,925 A * 3/1991 Krishnamurthy .. B01D 53/0476
                                                422/234
5,264,187 A   11/1993 Olbrich et al.
(Continued)

FOREIGN PATENT DOCUMENTS

EP   0321141 A2   6/1989
EP   1148025 A1   10/2001
(Continued)

OTHER PUBLICATIONS

Konunyants et al. "Chemical Encyclopedia"Moscow 1988, vol. 1 cols. 898-899 (Year: 1988).*
(Continued)

*Primary Examiner* — Anthony J Zimmer
*Assistant Examiner* — Syed T Iqbal

(57) ABSTRACT

This present disclosure relates to processes and apparatuses for removing contaminants from hydrogen streams. More specifically, the present disclosure relates to processes and apparatuses wherein hydrogen is used in units that utilize catalysts that are sensitive to oxygenates. The contaminants like carbon oxides and water are removed simultaneously from the hydrogen stream to provide a rich hydrogen stream with high purity to units that utilizes catalysts that are sensitive to oxygenates.

18 Claims, 1 Drawing Sheet

(51) Int. Cl.
  *B01D 53/86* (2006.01)
  *C10G 25/05* (2006.01)
(52) U.S. Cl.
  CPC ...... *B01D 2256/16* (2013.01); *B01D 2257/50* (2013.01); *B01D 2257/80* (2013.01); *B01D 2259/122* (2013.01)

(56) References Cited

U.S. PATENT DOCUMENTS

| | | | | |
|---|---|---|---|---|
| 5,663,466 | A * | 9/1997 | Rice | C07C 5/10 585/253 |
| 6,203,692 | B1 * | 3/2001 | Sarangapani | B01D 53/32 204/263 |
| 6,514,317 | B2 * | 2/2003 | Hirano | B01D 53/02 95/106 |
| 8,692,046 | B2 | 4/2014 | Shecterle | |
| 2001/0045160 | A1 | 11/2001 | Hirano et al. | |
| 2005/0229782 | A1 * | 10/2005 | Monereau | B01D 53/047 95/96 |
| 2010/0047160 | A1 * | 2/2010 | Allam | C01B 3/382 423/651 |
| 2011/0313222 | A1 | 12/2011 | Garney et al. | |
| 2012/0144860 | A1 | 6/2012 | Baldauf et al. | |
| 2013/0261358 | A1 | 10/2013 | Shecterle | |

FOREIGN PATENT DOCUMENTS

| | | |
|---|---|---|
| RU | 2532269 C2 | 7/2013 |
| RU | 2551510 C2 | 9/2013 |
| RU | 2544435 C2 | 1/2015 |
| RU | 2586070 C2 | 5/2016 |

OTHER PUBLICATIONS

Written Opinion from corresponding PCT application No. PCT/US2017/058458, completed Jan. 15, 2018.
International Preliminary Report on Patentability from corresponding PCT application No. PCT/US2017/058458, dated Apr. 30, 2019.
Chemical Encyclopedia, General Editor LL. Knunyants, Moscow 1988, vol. 1, cols. 898-899.
PCT Search Report dated Feb. 14, 2018 for corresponding PCT Application No. PCT/US2017/058458.

* cited by examiner

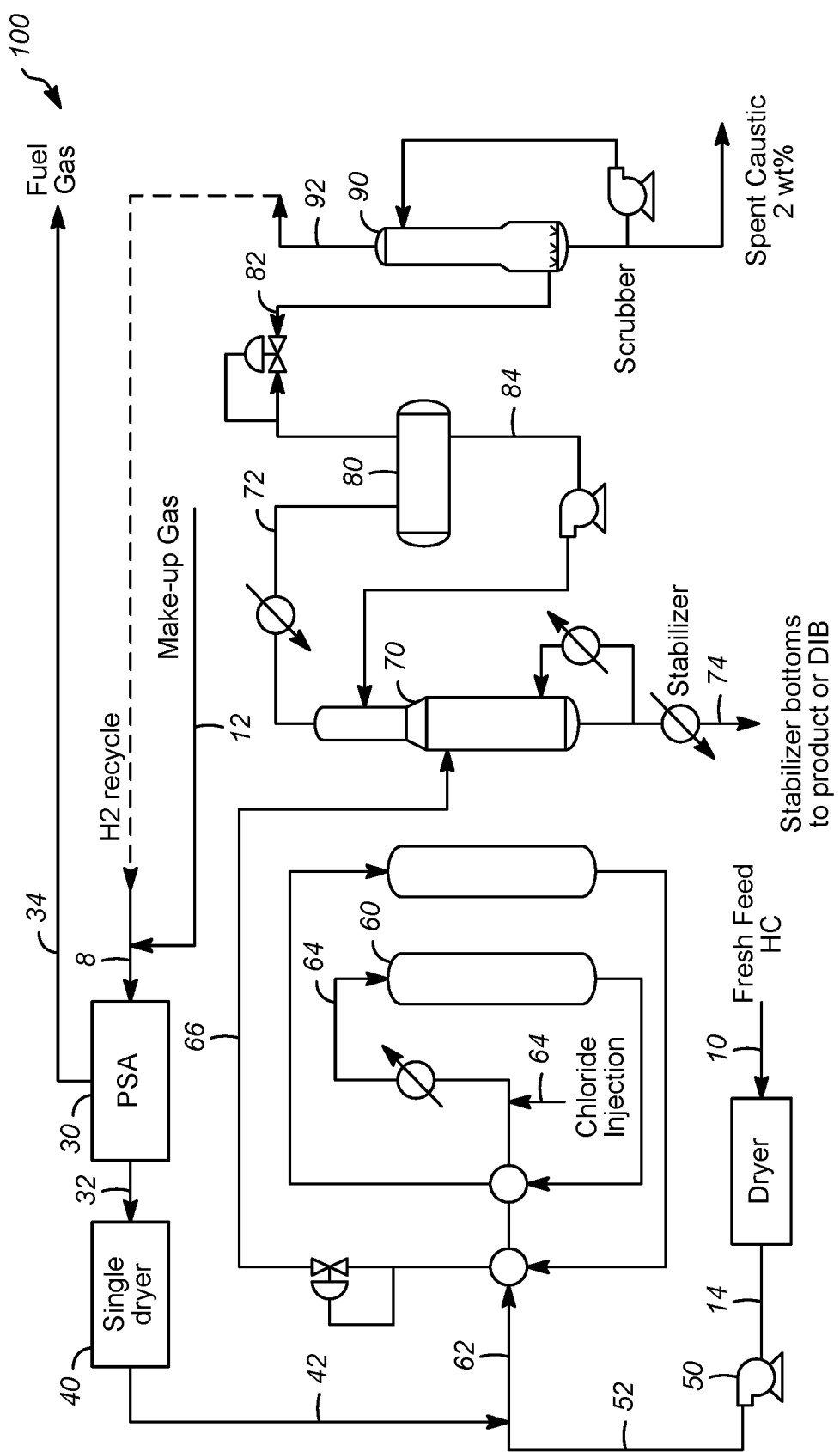

PROCESSES AND APPARATUSES FOR REMOVING CONTAMINANTS FROM HYDROGEN STREAMS

CROSS-REFERENCE TO RELATED APPLICATION

This application claims priority from Provisional Application No. 62/414,635 filed Oct. 28, 2016, the contents of which cited application are hereby incorporated by reference in its entirety.

FIELD

This present disclosure relates to processes and apparatuses for removing contaminants from hydrogen streams. More specifically, the present disclosure relates to processes and apparatuses for removal of water and carbon oxides from hydrogen that is used in units that utilizes catalysts that are deactivated by oxygenates.

BACKGROUND

The chlorided alumina catalysts used in the isomerization process are highly sensitive to water and carbon oxides. The exposure of these catalysts to even low levels of the contaminants like water and carbon oxides lead to severe and permanent catalyst deactivation. Conventionally, to protect the catalysts from deactivation, a molecular sieve drier system is used to remove water from the make-up hydrogen used in the process.

The traditional design of these driers used to remove water includes a two bed system, where one dryer can be removed periodically to be regenerated with a hot regenerant gas. While these kinds of dryers are effective for water removal, but are less effective for removing carbon oxides. Generally, adsorbents are added to the drier systems to remove carbon oxides such as carbon monoxide (CO) but the capacity of these adsorbents is low and the overall effectiveness is also low. Typically, the source of isomerization make-up gas used in reforming unit contains carbon monoxide, and additional treatment is needed to remove the carbon monoxide contaminant. Also, some isomerization processes have limitations on the level of oxygenates ingress into the system from the make-up gas. In such process, the ingress of carbon oxides and water with the make-up gas is high and continuous higher level of oxygenates and water in the reactor suppresses the catalyst activity. Generally, a separate system like a methanator is used to remove carbon monoxide and a separate system like molecular sieve is used to remove water in such chlorided alumina based isomerization units. The conventionally known multiple treatment steps to remove water and carbon oxides add significant costs and complexity to the design and operation of chlorided alumina based isomerization units.

Therefore, there is a need for a new process and apparatus to efficiently remove contaminants like water and carbon oxides in such units that utilizes catalysts that are deactivated by oxygenates. The use of such multiple systems to remove water and carbon oxides separately results in increased capital equipment costs and operating costs. Therefore, there is a need for an improved process and simplified apparatus design to remove water and carbon oxides in such systems simultaneously.

SUMMARY

An embodiment of the subject matter is a process for removing contaminants from hydrogen streams comprising passing a hydrogen stream to an adsorbent column. The hydrogen stream is contacted with an adsorbent in the adsorbent column at first operating conditions to remove a portion of at least one contaminant to produce a first effluent stream and a second effluent stream. The second effluent stream is passed to a single drying zone at second operating conditions to produce a dry hydrogen stream.

Another embodiment of the subject matter is an apparatus for removing contaminants from hydrogen streams in isomerization units comprising a gas stream inlet comprising hydrogen stream. An adsorption column comprising two or more adsorption vessels receiving the gas stream. An adsorbent in the adsorbent column to adsorb a portion of at least one contaminant from the gas stream at first operating conditions to produce a first effluent stream and a second effluent stream with reduced contaminant. A single drying zone downstream of the adsorption column to dry the second effluent stream at second operating conditions to produce a dry hydrogen stream with reduced contaminant. An isomerization zone downstream of the single drying zone receiving the dry hydrogen stream and a dry hydrocarbon stream as feed. The isomerization zone further contains a catalyst layer selected from chlorided alumina, sulfated zirconia or tungstated zirconia. The adsorbent is selected from alumina, silica gel, activated carbon and molecular sieves and combinations thereof.

It is an advantage of the subject matter to remove the contaminants like carbon oxides and water simultaneously in units that contain catalysts that are sensitive to carbon oxide and water. The present subject matter seeks to provide a novel process and apparatus for replacing the multiple treatment systems conventionally used for removing contaminants such as water, sulfur compounds, nitrogen and oxides and carbon oxides with a single pressure swing (PSA) dryer system.

Additional objects, advantages and novel features of the examples will be set forth in part in the description which follows, and in part will become apparent to those skilled in the art upon examination of the following description and the accompanying drawing or may be learned by production or operation of the examples. The objects and advantages of the concepts may be realized and attained by means of the methodologies, instrumentalities and combinations particularly pointed out in the appended claims.

BRIEF DESCRIPTION OF THE DRAWING

The FIGURE is a flow scheme for the process and apparatus of the present disclosure.

Corresponding reference characters indicate corresponding components throughout the drawing. Skilled artisans will appreciate that elements in the FIGURE are illustrated for simplicity and clarity and have not necessarily been drawn to scale. For example, the dimensions of some of the elements in the FIGURE may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The following description is not to be taken in a limiting sense, but is made merely for the purpose of describing the general principles of exemplary aspects. The scope of the present disclosure should be determined with reference to the claims.

The chlorided alumina catalysts used in the isomerization processes are highly sensitive to carbon oxides and water. The typical source of isomerization make-up gas to such units contains carbon oxides. The exposure to even low levels of contaminants like carbon oxide and water leads to catalyst deactivation. Traditionally several make-up gas driers are used in chlorided alumina catalysts based Isom units. To protect the catalyst from deactivation, a molecular sieve drier system is used to remove water from the make-up hydrogen used by the process. Typically, in such process, a methanator is used to remove carbon oxides along with a molecular sieve system to remove water for removal of all the contaminants from the hydrogen stream that can deactivate the catalysts in downstream processing. These multiple treatment systems add significant costs and complexity in design and operation of such chlorided alumina based Isom units.

The present subject matter provides a novel method and apparatus to remove carbon oxides and water from units that utilizes catalysts that are sensitive to oxygenates. The present subject matter uses a single pressure swing (PSA) dryer system to remove water and carbon oxides simultaneously. The units that utilize catalysts sensitive to oxygenates may be isomerization units. An advantage of the present subject matter is that the process also reduces the size of caustic treating equipment needed to treat the stabilizer off gas and may allow recovery of any excess hydrogen contained in the stabilizer off gas. The spent caustic disposal costs are also reduced. An additional benefit of the present subject matter is reduced cost and simplified operation of the isomerization units.

The isomerization unit may be integrated with a CCR reforming unit; in such units the tail gas from PSA dryer could be recycled back to the Platforming separator to recover residual hydrogen. This is particularly useful because it allows the PSA unit to be optimized for high purity rather than high recovery as hydrogen will not be lost in the tail gas. This makes the operation more robust and reduces the complexity of the system and number of beds used. Using a PSA drier with hydrogen purification capability enables recycle of the stabilizer hydrogen to the isomerization unit by allowing the mechanism to reject both water and light gases from the stabilizer off gas.

A general understanding of the process and apparatus for removal of contaminants from hydrogen streams can be obtained by reference to the FIGURE. The FIGURE has been simplified by the deletion of a large number of apparatuses customarily employed in a process of this nature, such as vessel internals, temperature and pressure controls systems, flow control valves, recycle pumps, etc. which are not specifically required to illustrate the performance of the invention. Furthermore, the illustration of the process and apparatus of the subject matter in the embodiment of a specific drawing is not intended to limit the invention to specific embodiments set out herein.

The present subject matter, as shown in the FIGURE, includes a reactor system 100 for a process for removal of contaminants from hydrogen streams. A feed gas stream in line 8 comprising hydrogen is passed to the reactor system 100. A make-up gas stream comprising hydrogen in line 12 may be added to the gas stream in line 8. The gas stream in line 8 is passed to an adsorbent column 30. The adsorbent column 30 may be a pressure swing (PSA) drier system. The gas stream in line 8 is contacted with an adsorbent in the adsorbent column 30 to remove at least a portion one contaminant. A first effluent stream in line 34 and a second effluent stream in line 32 exit the adsorbent column 30. The operating conditions for the adsorbent column will include an operating temperature in the range of from about 20° C. to about 55° C. and a pressure in the range of about 75 psig to about 1000 psig. The preferred operating temperature will be within the range of from about 35° C. to about 45° C. and a pressure of about 300 psig to about 400 psig.

The hydrogen gas stream in line 8 comprises contaminants like carbon oxides, water, sulfur compounds such as hydrogen sulfide, and nitrogen oxide. The contaminants are adsorbed into the adsorbents by contacting the hydrogen stream with the adsorbent in the adsorbent column. The treated hydrogen stream with reduced contaminant exits the adsorbent column in line 32. The first effluent stream in line 42 is taken at the overhead of the adsorbent column 30 may be processed as a fuel gas. A single drying zone 40 is in downstream communication with the adsorbent column 30. The effluent from the adsorbent column in line 32 is fed to the single drying zone 40 to produce a dry hydrogen stream in line 42. The operating conditions for the single drying zone will include an operating temperature in the range of from about 20° C. to about 55° C. and a pressure in the range of about 75 psig to about 1000 psig. The preferred operating temperature will be about 35° C. and a pressure of about 350 psig to about 550 psig.

The adsorbent column 30 may include two or more adsorption vessels comprising an adsorbent. The operating conditions for the adsorbent column will include an operating temperature in the range of from about 20° C. to about 55° C. and an operating pressure in the range of about 75 psig to about 1000 psig. The preferred operating temperature will be within the range of from about 35° C. to about 45° C. and operating pressure of about 300 psig to about 400 psig.

The adsorbent column 30 includes adsorbents that may be selected from a variety of potential adsorbents like alumina, silica gel, activated carbon and molecular sieves. The adsorbent may also be a combination of adsorbents like alumina, silica gel, activated carbon and molecular sieves.

The term "adsorption" as used herein encompasses the use of a solid support to remove atoms, ions, and molecules from a gas or liquid. The adsorption may be by "physisorption" in which the adsorption involves surface attractions or "chemisorptions" where there are actual chemical changes in the contaminant that is being removed. The adsorbents may be any porous material known to have an application as an adsorbent including carbon materials such as activated carbon clays, molecular sieves including zeolites, metal oxides including silica gel and alumina that are promoted or activated, as well as other porous materials that can be used to remove or separate the contaminants.

The single drying zone 40 comprises a single dryer. The single dryer comprises molecular sieve adsorbents to remove water from the hydrogen stream in line 32. The hydrogen rich stream removed in line 42 from the single drying zone 40 is water and sulfur free. The hydrogen rich stream in line 42 has less than 1 mole-ppm carbon oxide. The hydrogen rich stream in line 42 has predominantly carbon compounds from 1 to 8 and trace amounts of oxygenates such as carbon oxides, nitrogen oxides and does not require any further downstream treatment before entering the process unit that uses catalysts sensitive to oxygenates. The hydrogen rich stream in line 42 may be directly sent to the Isom unit for isomerization and further use. A hydrocarbon stream in line 10 is passed to a drying zone to remove water from the hydrocarbon stream and provide a dried hydrocarbon stream in line 14. The hydrocarbon stream in line 10 comprises compounds with carbon number ranging from 1 to 12. The dried hydrocarbon stream in line 14 exiting the drier may be compressed in a compressor 50. The compressed dry hydrocarbon stream in line 52 is added to the dry hydrogen stream in line 42 to form a combined stream in line 62. The combined stream comprising the dry hydrogen and dry hydrocarbon in line 62 is passed to an isomerization reactor 60. The combined hydrogen rich stream in line 62 sent to the isomerization reactor may comprise chloride. Chlorides in the form of hydrogen chloride may be added externally to the reactor by chloride injection in line 64.

The hydrogen rich stream in line 62 may be neutralized in a vessel using caustic solution (not shown). The hydrogen rich stream that is chloride depleted may be contacted with a water wash column to remove any residual caustic (not shown) and provide chloride depleted hydrogen rich stream in line 64. The hydrogen rich stream 64 comprises hydrogen, predominantly carbon compounds from 1 to 8, and trace amounts of oxygenates such as carbon oxides, nitrogen oxides and sulfur compounds. The contaminant reduced hydrogen rich stream in line 64 is passed to the reaction zone 60. The reaction zone 60 may be an isomerization zone or any other reactor unit that utilizes catalysts sensitive to oxygenates. The isomerization zone 60 is downstream of the single drying zone 40. The isomerization reaction zone 60 may be in a single isomerization reactor or in two or more separate reactors with suitable means to ensure the desired isomerization temperature is maintained at the entrance to each zone. Two or more reactors in sequence are preferred to enable improved isomerization through control of individual reactor temperatures and for partial catalyst replacement without a process shutdown. Suitable isomerization reaction may be carried out according to the "UOP Butamer Process," "UOP IsomEx Process" and "UOP Penex Process" as described in the Handbook, namely HANDBOOK OF PETROLEUM REFINING PROCESSES, edited by Robert A. Meyers, McGraw Hill.

The isomerization zone 60 may comprise isomerization catalysts selected from chloride alumina, sulfated zirconia or tungstated zirconia. The isomerization may be carried out in the presence of chloride containing catalysts. The isomerization catalysts can be amorphous, crystalline, or a mixture of both. Contacting within the isomerization reactor maybe effected using the catalyst in fixed bed system, a moving bed system, a fluidized bed system, or in a batch type operation. However, the choice of particular reactants, reactor bed system and catalysts is not intended to limit the scope of the present subject matter.

The operating conditions for the isomerization zone 60 will include an operating temperature in the range of from about 40° C. to about 250° C. and an operating pressure in the range of about 14.5 psig to about 1450 psig. The preferred operating temperature will be within the range of from about 100° C. to about 200° C. and operating pressure of about 72.5 psig to about 580 psig. Liquid hourly space velocities range from about 0.2 to about 25 volumes of isomerizable hydrocarbon feed per hour per volume of catalyst, within a range of about 0.5 to 15 $hr^{-1}$ being preferred.

The effluent from the isomerization unit in line 66 may be cooled and passed to a distillation column 70. The distillation column may be a stabilizer. The overhead from the stabilizer in line 72 is a light gas byproduct. The bottoms stream from the stabilizer in line 74 may be recovered as a product or used for further processing. The stabilizer overhead in line 72 is passed to a receiver 80 for phase separation. The overhead gas comprising hydrogen from the receiver 80 in line 82 is passed to a scrubber 90. A portion of the liquid product taken from the bottom of the receiver in line 84 may be refluxed to the stabilizer 70. The scrubbed hydrogen rich gas from the overhead of the scrubber in line 92 may be recycled to be combined with hydrogen stream in line 8 fed to the adsorbent column 30.

The removal of contaminants from hydrogen stream that is used in units that utilizes catalysts that are sensitive to oxygenates by use of PSA drier system provides an effective removal of carbon oxides and water from the hydrogen streams. The hydrogen rich stream with reduced contaminants comprises from about 70 mole % to about 99.99 mole % purity and preferably the purity is between about 80 mole % to 92 mole %. The hydrogen rich stream with reduced contaminants may be used in isomerization units and other process units that utilizes catalysts that can be sensitive to oxygenates and as a result avoids consequent undesirable downstream reactions like deactivation of catalysts.

While the subject matter has been described with what are presently considered the preferred embodiments, it is to be understood that the subject matter is not limited to the disclosed embodiments, but it is intended to cover various modifications and equivalent arrangements included within the scope of the appended claims.

SPECIFIC EMBODIMENTS

While the following is described in conjunction with specific embodiments, it will be understood that this description is intended to illustrate and not limit the scope of the preceding description and the appended claims.

A first embodiment of the subject matter is a process for removing contaminants from hydrogen streams comprising passing a hydrogen stream to an adsorbent column; contacting the hydrogen stream with an adsorbent in the adsorbent column at first operating conditions to remove a portion of at least one contaminant to produce a first effluent stream; and passing the second effluent stream to a single drying zone at second operating conditions to produce a dry hydrogen stream. An embodiment of the invention is one, any or all of prior embodiments in this paragraph up through the first embodiment in this paragraph further comprising sending the dry hydrogen stream to a process unit that utilizes a catalyst that is deactivated by oxygenates. An embodiment of the invention is one, any or all of prior embodiments in this paragraph up through the first embodiment in this paragraph wherein the hydrogen stream is a recycle stream. An embodiment of the invention is one, any or all of prior embodiments in this paragraph up through the first embodiment in this paragraph wherein the first operating condition comprise a temperature of about 20° C. to about 55° C. An embodiment of the invention is one, any or all of prior embodiments in this paragraph up through the first embodiment in this paragraph wherein the first operating conditions comprise a pressure of about 75 psig to about 1000 psig. An embodiment of the invention is one, any or all of prior embodiments in this paragraph up through the first embodiment in this paragraph wherein the contaminant comprises carbon oxides, water, nitrogen oxides, and sulfur compounds. An embodiment of the invention is one, any or all of prior embodiments in this paragraph up through the first embodiment in this paragraph wherein the adsorbent is selected from alumina, silica gel, activate carbon and molecular sieves. An embodiment of the invention is one, any or all of prior embodiments in this paragraph up through the first embodiment in this paragraph wherein the adsorbent comprises combination of alumina, silica gel, activated carbon and molecular sieves. An embodiment of the invention is one, any or all of prior embodiments in this paragraph up through the first embodiment in this paragraph wherein the second operating conditions comprise a temperature of about 20° C. to about 55° C. and a pressure of about 75 psig to about 1000 psig. An embodiment of the invention is one, any or all of prior embodiments in this paragraph up through the first embodiment in this paragraph wherein the drying zone may comprise molecular sieve adsorbents. An embodiment of the invention is one, any or all of prior embodiments in this paragraph up through the first embodiment in this paragraph wherein the dry hydrogen stream comprises from about 70 mole % to about 99.99 mole % purity. An embodiment of the invention is one, any or all of prior embodiments in this paragraph up through the first embodiment in this paragraph wherein the hydrogen stream may contain a fresh hydrogen feed. An embodiment of the invention is one, any or all of prior embodiments in this paragraph up through the first embodiment in this paragraph wherein the first effluent stream is processed as fuel gas. An embodiment of the invention is one, any or all of prior embodiments in this paragraph up through the first embodiment in this paragraph further comprising adding a dry hydrocarbon stream to the dry hydrogen stream and passing the combined stream to a process unit that utilizes a catalyst that is deactivated by oxygenates. An embodiment of the invention is one, any or all of prior embodiments in this paragraph up through the first embodiment in this paragraph wherein a hydrogen rich stream comprising chloride is neutralizes in a vessel using a caustic solution. An embodiment of the invention is one, any or all of prior embodiments in this paragraph up through the first embodiment in this paragraph further comprising contacting the hydrogen rich stream that is chloride depleted with a water wash to remove residual caustic. An embodiment of the invention is one, any or all of prior embodiments in this paragraph up through the first embodiment in this paragraph wherein the hydrogen rich stream comprises hydrogen, and predominantly carbon compounds from 1 to 8, and trace amounts of oxygenates such as carbon oxides, nitrogen oxides and sulfur compounds. An embodiment of the invention is one, any or all of prior embodiments in this paragraph up through the first embodiment in this paragraph wherein the contaminants such as water, sulfur are completely removed. An embodiment of the invention is one, any or all of prior embodiments in this paragraph up through the first embodiment in this paragraph wherein carbon oxide is removed to less than 1 mole-ppm.

A second embodiment of the invention is an apparatus for removing contaminants from hydrogen streams in isomerization units, comprising a gas stream inlet comprising hydrogen; an adsorption column comprising two or more adsorption vessels receiving the gas stream; an adsorbent in the adsorbent column to adsorb a portion of at least one contaminant from the gas stream at first operating conditions to produce a first effluent stream and a second effluent stream with reduced contaminant; a single drying zone downstream of the adsorption column to dry the second effluent stream at second operating conditions to produce a dry hydrogen stream with reduced contaminant; an isomerization zone downstream of the single drying zone receiving the dry hydrogen and a dry hydrocarbon stream as feed; wherein the isomerization zone contains a catalyst layer selected from chlorided alumina, sulfated zirconia or tungstated alumina; and wherein the adsorbent is selected from alumina, silica gel, activated carbon and molecular sieves and combinations thereof.

Without further elaboration, it is believed that using the preceding description that one skilled in the art can utilize the present subject matter to its fullest extent and easily ascertain the essential characteristics of this subject matter, without departing from the spirit and scope thereof, to make various changes and modifications of the subject matter and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

The invention claimed is:

1. A process comprising:
  passing a hydrogen stream to an adsorbent column;
  contacting the hydrogen stream with an adsorbent in the adsorbent column at first operating conditions to remove a portion of at least one contaminant to produce a first effluent stream and a second effluent stream, wherein the hydrogen stream is a recycle stream, and wherein the first effluent stream is a tail gas stream and the second effluent stream is a hydrogen rich stream;
  passing the second effluent stream directly to a single drying zone at second operating conditions to produce a dry hydrogen stream; and
  sending the dry hydrogen stream to a reactor, wherein the reactor is an isomerization reactor utilizes a catalyst that is deactivated by oxygenates.

2. The process according to claim 1, wherein the first operating conditions comprise a temperature of about 20° C. to about 55° C.

3. The process according to claim 1, wherein the first operating conditions comprise a pressure of about 517 kPa (75 psig) to about 6895 kPa (1000 psig).

4. The process according to claim 1, wherein the contaminant comprises carbon oxides, water, nitrogen oxides, and sulfur compounds.

5. The process according to claim 1, wherein the adsorbent is selected from alumina, silica gel, activated carbon and molecular sieves.

6. The process according to claim 1, wherein the adsorbent comprises combination of alumina, silica gel, activated carbon and molecular sieves.

7. The process according to claim 1, wherein the second operating conditions comprise a temperature of about 20° C. to about 55° C. and a pressure of about 517 kPa (75 psig) to about 6895 kPa (1000 psig).

8. The process according to claim 1, wherein the drying zone comprises molecular sieve adsorbents.

9. The process according to claim 1, wherein the dry hydrogen stream comprises from about 70 mole % to about 99.99 mole % purity.

10. The process according to claim 1, wherein the hydrogen stream may contain a fresh hydrogen feed.

11. The process according to claim 1, wherein the first effluent stream is processed as a fuel gas.

12. The process according to claim 1 further comprising adding a dry hydrocarbon stream to the dry hydrogen stream to form a combined stream and passing the combined stream to the reactor, wherein the reactor utilizes a catalyst that is deactivated by oxygenates.

13. The process according to claim 1, wherein a hydrogen rich stream comprising chloride is neutralized in a vessel using a caustic solution.

14. The process according to claim 12, further comprising contacting the combined stream with a water wash to remove any residual caustic.

15. The process according to claim 14, wherein the combined stream comprises of hydrogen, and predominantly carbon compounds having chain lengths ranging from 1 to 8, and trace amounts of oxygenates including carbon oxides, nitrogen oxides and sulfur compounds.

16. The process according to claim 14, wherein contaminants including water, sulfur, are completely removed.

17. The process according to claim 16, wherein carbon oxide is removed to less than 1 mole-ppm.

18. A process comprising:
passing a hydrogen stream to an adsorbent column;
contacting the hydrogen stream with an adsorbent in the adsorbent column at first operating conditions to remove a portion of at least one contaminant to produce a first effluent stream and a second effluent stream, wherein the first effluent stream is a tail gas stream and the second effluent stream is a hydrogen rich stream; and
passing the second effluent stream directly to a single drying zone at second operating conditions to produce a dry hydrogen stream;
adding a dry hydrocarbon stream to the dry hydrogen stream to form a combined stream, wherein the combined stream comprises hydrogen, and predominantly carbon compounds having chain lengths ranging from 1 to 8, and trace amounts of oxygenates including carbon oxides, nitrogen oxides and sulfur compounds;
passing the combined stream to a reactor, wherein the reactor utilizes a catalyst that is deactivated by oxygenates;
contacting the combined stream with a water wash to remove any residual caustic.

* * * * *